United States Patent
McFarland et al.

(10) Patent No.: US 8,154,769 B2
(45) Date of Patent: Apr. 10, 2012

(54) SYSTEMS AND METHODS FOR GENERATING AND PROCESSING EVOLUTIONARY DOCUMENTS

(75) Inventors: Max E. McFarland, Sunnyvale, CA (US); Michael G. E. Griffin, Redwood City, CA (US); Jonathan J. Hull, San Carlos, CA (US); Kurt Piersol, Campbell, CA (US)

(73) Assignee: Ricoh Co. Ltd, Tokyo (JP)

( * ) Notice: Subject to any disclaimer, the term of this patent is extended or adjusted under 35 U.S.C. 154(b) by 1076 days.

(21) Appl. No.: 11/223,768

(22) Filed: Sep. 8, 2005

(65) Prior Publication Data
US 2006/0184522 A1 Aug. 17, 2006

Related U.S. Application Data

(60) Provisional application No. 60/653,422, filed on Feb. 15, 2005.

(51) Int. Cl.
*H04N 1/00* (2006.01)
(52) U.S. Cl. ........ 358/400; 358/462; 358/443; 358/448; 358/500; 358/505; 715/221; 715/222; 715/223; 715/224; 715/225; 235/375; 235/462.01; 235/462.08; 235/462.09
(58) Field of Classification Search .................. 235/375, 235/462.01, 462.08, 462.09; 715/221, 222, 715/223, 224, 225, 226; 358/400, 462, 443, 358/448, 500, 505
See application file for complete search history.

(56) References Cited

U.S. PATENT DOCUMENTS

| | | | |
|---|---|---|---|
| 5,991,469 | A | 11/1999 | Johnson et al. |
| 6,025,200 | A | 2/2000 | Kaish et al. |
| 6,088,700 | A | 7/2000 | Larsen et al. |
| 6,144,975 | A | 11/2000 | Harris et al. |

(Continued)

FOREIGN PATENT DOCUMENTS

EP 1014254 A2 6/2000

(Continued)

OTHER PUBLICATIONS

European Search Report, EP 06003031, May 24, 2006, 7 pages.

(Continued)

*Primary Examiner* — Benny Q Tieu
*Assistant Examiner* — Martin Mushambo
(74) *Attorney, Agent, or Firm* — Patent Law Works LLP

(57) ABSTRACT

An evolutionary document system comprises: a multi-function printer, a recognition module, an evolutionary document processing module, a list of document identifiers and corresponding actions, and an evolutionary document creation module. The MFP includes software and control routines for processing and creating evolutionary documents. The recognition module is operable on the MFP and allows the MFP to determine an evolutionary document identification number from an image scanned by the MFP. The evolutionary document processing module is capable of matching an evolutionary document identification number to one or more steps or action stored in the list of document identifiers and corresponding actions. Once the actions have been identified, the evolutionary document processing module executes the actions. The present invention also includes an evolutionary document creation module for creating an evolutionary document including an identification code. The evolutionary document creation module also creates the actions associated with the evolutionary document and an entry in the list of document identifiers and corresponding actions. The present invention also includes a method for creating an evolutionary document, a method for processing an evolutionary document, and a method for printing an evolutionary document.

40 Claims, 14 Drawing Sheets

U.S. PATENT DOCUMENTS

| | | |
|---|---|---|
| 6,411,972 B1 | 6/2002 | Parikh et al. |
| 6,585,154 B1 * | 7/2003 | Ostrover et al. ............... 235/375 |
| 6,651,217 B1 | 11/2003 | Kennedy et al. |
| 6,816,630 B1 * | 11/2004 | Werth et al. .................... 382/287 |
| 6,886,136 B1 | 4/2005 | Zlotnick et al. |
| 7,246,748 B1 * | 7/2007 | Feuerman et al. ........ 235/462.09 |
| 7,296,221 B1 | 11/2007 | Treibach-Heck et al. |
| 2002/0141660 A1 * | 10/2002 | Bellavita et al. ............... 382/309 |
| 2002/0170973 A1 * | 11/2002 | Teraura ......................... 235/492 |
| 2003/0025951 A1 | 2/2003 | Pollard et al. |
| 2003/0106018 A1 | 6/2003 | Silverbrook et al. |
| 2004/0039988 A1 | 2/2004 | Lee et al. |
| 2004/0068693 A1 | 4/2004 | Rawat et al. |
| 2004/0078337 A1 | 4/2004 | King et al. |
| 2004/0181749 A1 | 9/2004 | Chellapilla et al. |
| 2005/0002053 A1 | 1/2005 | Meador et al. |
| 2005/0038756 A1 * | 2/2005 | Nagel ............................. 705/76 |
| 2005/0163361 A1 | 7/2005 | Jones et al. |
| 2005/0289182 A1 | 12/2005 | Pandian et al. |
| 2006/0047639 A1 | 3/2006 | King et al. |
| 2006/0242567 A1 | 10/2006 | Rowson et al. |

FOREIGN PATENT DOCUMENTS

| | | |
|---|---|---|
| JP | 04-135885 | 5/1992 |
| JP | 11272654 | 10/1999 |
| JP | 2001-034692 | 2/2001 |
| JP | 2002-120475 | 4/2002 |
| JP | 2002-245075 | 8/2002 |
| JP | 2003-0150585 | 5/2003 |
| JP | 2004348619 | 12/2004 |
| WO | WO 03/071850 A2 | 9/2003 |

OTHER PUBLICATIONS

European Examination Report, European Application No. 06003031.9, Feb. 2, 2009, 7 pages.

United States Office Action, U.S. Appl. No. 11/608,796, Oct. 19, 2009, 14 pages.

Office Action, U.S. Appl. No. 11/608,796, Apr. 30, 2010, 16 pages.

U.S. Office Action, U.S. Appl. No. 11/608,796, Nov. 26, 2010, 19 pages.

Japanese Office Action, Japanese Patent Application No. 2006-027204, Mar. 22, 2011, 4 pages.

U.S. Office Action, U.S. Appl. No. 11/608,796, Apr. 28, 17 pages.

Japanese Office Action, Japanese Patent Application No. 2006-027204, Oct. 25, 2011, 3 pages.

U.S. Office Action, U.S. Appl. No. 11/608,796, Oct. 12, 2011, 19 pages.

* cited by examiner

230

STATE OF FLORIDA
DEPARTMENT OF MANAGEMENT SERVICES
Facilities Program, Paid Parking Section
4050 Esplanade Way, Bldg. 4030, Suite 350, Tallahassee, Fl. 32399-0950
(850) 488-6680 Suncom: 278-6680 * Fax: 922-5844 Suncom: 292-5844

APPLICATION FOR RESERVED PARKING

APPLICATION #: _____
(To be completed by DMS)

|  | First time ☐ | Covered ☐ |
|---|---|---|
| APPLYING FOR LOT(S): _____ | Change Space ☐ | Uncovered ☐ |
| Applications accepted for Lots 2, 50, A, B, D or E | Current Space _____ (Specify Lot, Level, Space) | Small Car ☐ |
|  |  | Large Car ☐ |

NAME: _Joe_ ⟵ 302

SOCIAL SECURITY #: _Moon_ ⟵ 304
DEPARTMENT: _____
WORK #: _____

BUILDING HOUSED IN: _____ ROOM #: _____

- I UNDERSTAND THAT MY APPLICATION WILL BE VOIDED IF I REFUSE THE SPACE OFFERED, MOVE OUT OF A CAPITOL CENTER STATE OWNED BUILDING, FAIL TO ADVISE THE PAID PARKING SECTION OF A NEW CONTACT PHONE NUMBER OR ON AN EXTENDED LEAVE OF ABSENCE WHEN CONTACTED.

- I UNDERSTAND THAT IF MY APPLICATION IS VOIDED FOR ONE OF THE REASONS STATED ABOVE, I AM REQUIRED TO SUBMIT ANOTHER APPLICATION IN ORDER TO BE ELIGIBLE FOR A SPACE AT ANOTHER TIME.

⟵ 308
_____  _____
SIGNATURE OF APPLICANT     DATE OF APPLICATION

| FOR OFFICIAL USE ONLY |
|---|
| SPACE OFFERED:  LOT:____  LEVEL:____  SPACE:____  DATE: |
| RESULTS:____ |

SYSTEMS AND METHODS FOR GENERATING AND PROCESSING EVOLUTIONARY DOCUMENTS

CROSS REFERENCE TO RELATED APPLICATIONS

This application claims the benefit of U.S. Provisional Application No. 60/653,422, filed Feb. 15, 2005, entitled "EVOLUTIONARY DOCUMENTS: INTEGRATION OF PAPER-BASED AND ELECTRONIC DOCUMENT PROCESSING", by Max E. McFarland, Michael G. E. Griffin, Jonathan J. Hull, and Kurt Wesley Piersol which is incorporated by reference in its entirety.

BACKGROUND OF THE INVENTION

1. Field of the Invention

The present invention relates to systems and methods for scanning, printing and reproducing documents. In particular, the present invention relates to a system and methods for encoding instructions and a form type into a document. Furthermore, the present invention relates to method for scanning a document, decoding instructions in the document and executing the decoded instructions.

2. Description of the Background Art

The use and proliferation of paper copiers is well known. Since their introduction, photocopiers have become and essential and basic part of every office and organization. Recently, the functionality of printers and photocopiers has converged into a new device referred to as Multi-Function Printer (MFP). Such multifunction printers have become commonplace and typically include the ability to scan documents, print documents, photocopy documents, and send and receive facsimile transmissions. This in turn has generated a large number of forms and papers that require organization and processing.

Long before the proliferation of copiers made duplication of documents easy and readily accessible, a number of forms were used to gather and organize information. Such forms are even in greater use due in part to copiers and allow the users to extract specific information needed for the performance of further actions or tasks. One difficulty with such forms is the ability to covert the forms into a format that is usable by digital machines such as computers.

The prior art has attempted to solve this problem with optical character recognition, but it is prone to errors and is very computationally expensive. For most applications, where there are millions of documents, such a solution is not acceptable. Moreover, the prior art has not devised a method for determining the type of processing that should be undertaken for a given document. Thus, there is a need for a system that is able to scan a document and provide automatic processing of the scanned image.

Therefore, what is needed is a system and methods for encoding instructions and a form type into a document, and responsive to scanning of the document, decoding instructions in the document and executing the decoded instructions.

SUMMARY OF THE INVENTION

The present invention overcomes the deficiencies and limitations of the prior art by providing an evolutionary document system. In one embodiment, evolutionary document system comprises: a multi-function printer, a recognition module, an evolutionary document processing module, a list of document identifiers and corresponding actions, and an evolutionary document creation module. The multi-function printer includes the capabilities of a conventional multifunction printer including the ability to scan documents, copy documents and print documents. In addition, the MFP includes software and control routines for processing and creating evolutionary documents. The recognition module is operable on the MFP and allows the MFP to determine an evolutionary document identification number from an image scanned by the MFP. The evolutionary document processing module is capable of matching an evolutionary document identification number to one or more steps or action stored in the list of document identifiers and corresponding actions. Once the actions have been identified, the evolutionary document processing module executes the actions. The present invention also includes an evolutionary document creation module for creating an evolutionary document including an identification code. The evolutionary document creation module also creates the actions associated with the evolutionary document and an entry in the list of document identifiers and corresponding actions.

The present invention also includes a number of novel methods including: a method for creating an evolutionary document, a method for processing an evolutionary document, and a method for printing an evolutionary document.

BRIEF DESCRIPTION OF THE DRAWINGS

The invention is illustrated by way of example, and not by way of limitation in the figures of the accompanying drawings in which like reference numerals are used to refer to similar elements.

FIG. 3C is a graphical representation of a third exemplary document that has been processed by according to one embodiment of the present invention.

DETAILED DESCRIPTION OF THE PREFERRED EMBODIMENTS

Figure 1:
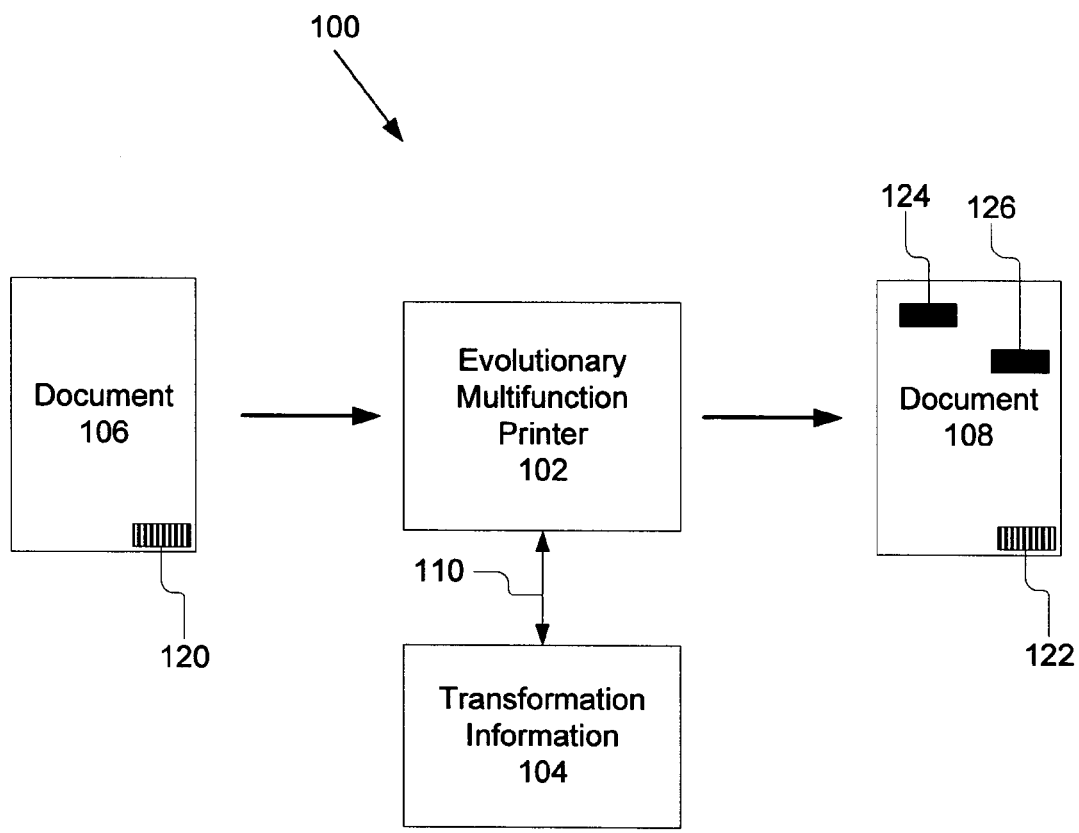
FIG. 1 is a block diagram of a first embodiment of the evolutionary document system of the present invention.

System and methods for creating and processing evolutionary documents are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to a one-to-many generation of documents using the evolutionary document system. However, the present invention applies to any type of multi-function printer that has the ability to process evolutionary documents even if no documents are generated.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system or network. For example, the invention can operate on a stand alone multifunction printer or a networked printer with functionality varying depending on the configuration. Thus, the present invention is capable of operating with any information system from those with minimal functionality to those providing all the functionality disclosed herein.

System Overview

Referring now to FIG. 1, a first embodiment of the evolutionary document system 100 of the present invention is shown. In this first embodiment, the system 100 comprises: an evolutionary multifunction printer 102, storage for transformation information 104 and at least one document 106.

The present invention is directed to a concept of evolutionary copying where users add something to a paper document 106, probably with handwriting, copy it, and get something different in return. A typical example is shown in FIG. 1 in which a paper document 106 that includes confidential information is copied on an evolutionary multifunction printer 102. The evolutionary multifunction printer 102 uses the bar code 120 to identify the document 106 and the transformation that should be applied to it. The bar code 120 provides the mapping between scanned document images and the actions that are applied to them. In another embodiment, the bar code is a self-contained representation for the fields on the document and the actions that are applied to them, and the evolutionary multifunction printer 102 includes interpreter for logic embedded in the bar code. The bar code could also contain instructions about creating the next generation of the form, including options that could be confirmed on the user interface. For example, the user might choose to type in their phone number on the evolutionary multifunction printer's key pad. This symbolic data could be encoded directly in the "new" bar code. The bar code could include the complete lifecycle of the form or it could include just a partial lifecycle with the missing information filled in by reference to an online source. In this case, the confidential information is located and redacted by printing black rectangles 124, 126 over the top of it. A prompt is displayed on the console (not shown) of the evolutionary multifunction printer 102 instructing the user to destroy the original document.

The document 106 in one embodiment includes a code 120. This code 120 is a machine-readable identification number that can be translated by the evolutionary multifunction printer 102 into instructions or algorithms that are applied to create ensuing generations of the document 106. Different documents 106, 108 may have the same code 120 or different codes 120, 122 depending on their stage of evolution or generation. For example, as shown in FIG. 1, document 106 with code 120 is input to the evolutionary multifunction printer 102. Responsive to instructions from the user such as using a keypad of the evolutionary multifunction printer 102, it generates an output document 108. This output document 108 includes its own code 122 as well as having its own form or format, and certain portions 124, 126 modified during the reproduction process. For example in the simplest of operations, the code 120 may be interpreted by the evolutionary multifunction printer 102 such that the document 106 is reproduced with two portions 124, 126 redacted or blacked out, and the code updated to be code 122.

While the documents 106, 108 will be described below as including codes for identification of the document 106, 108 and each document's associated transformations, it will be understood that in an alternate embodiment, the evolutionary multifunction printer 102 could include a pattern recognition module (not shown) for identifying which document or form has been input and what corresponding transformations should be applied to the input document.

The evolutionary multifunction printer 102 is described below in more detail with reference to FIGS. 4 and 5, and has the functionality of a conventional MFP such as the ability to scan, copy and fax. The evolutionary multifunction printer 102 preferably also includes a coupling to a network. The evolutionary multifunction printer 102 includes the capability of being able to recognize documents and/or codes, and transforming scanned images to produce new documents. The evolutionary multifunction printer 102 can also perform a variety of different actions on the scanned image or data input as will be described in more detail below.

The storage 104 for transformation information is coupled by signal line 110 to (or included as part of) the evolutionary multifunction printer 102. The storage 104 includes one or more transformations for the scanned image. Each of the transformations is preferably associated with one or more documents or codes. More particularly, a particular document may have any number of transformations from zero to n associated with it. Similarly, each transformation may be used with one or more documents. Specific examples will be discussed in detail below.

Figure 2:
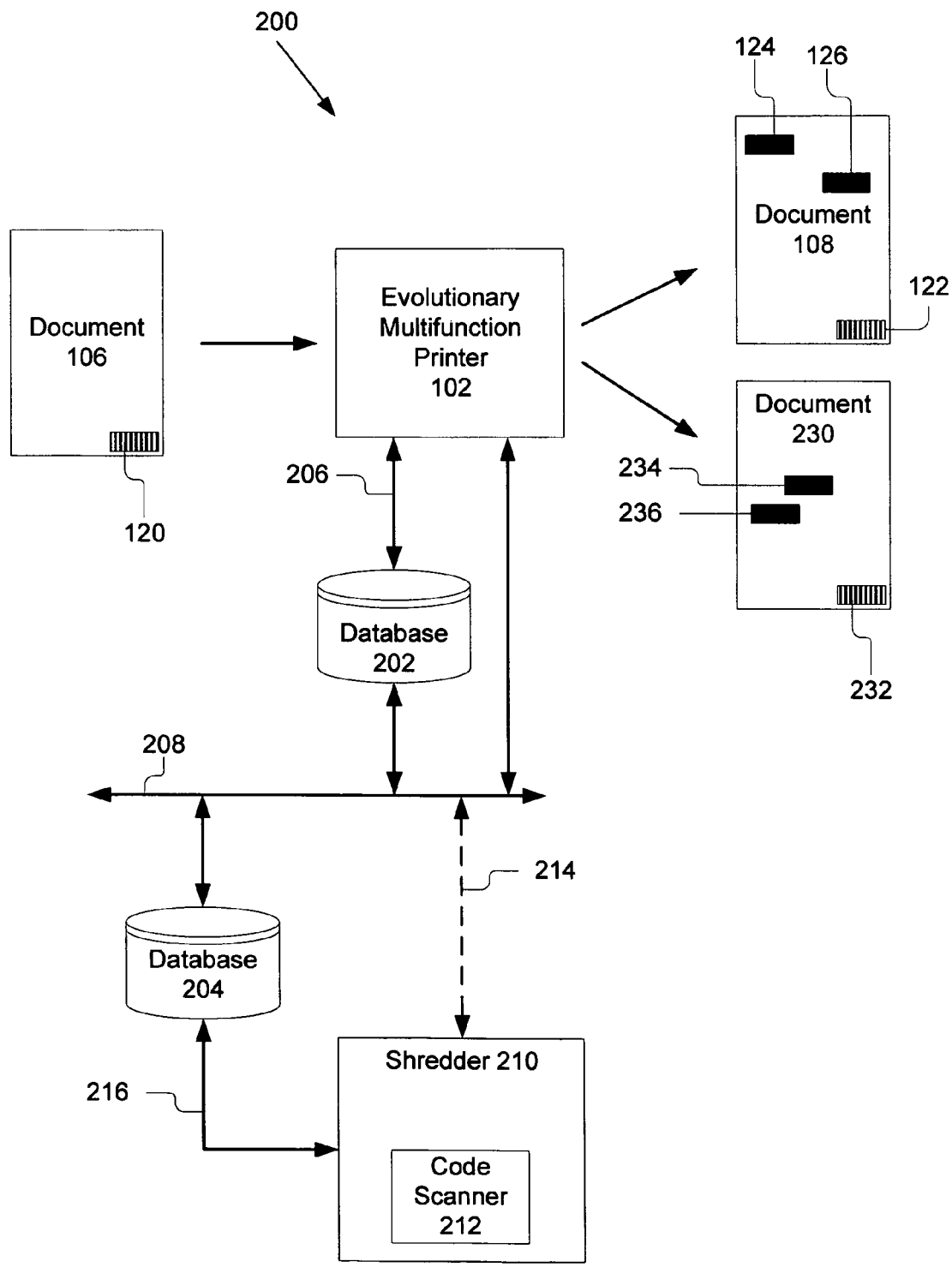
FIG. 2 is a block diagram of a second embodiment of the evolutionary document system of the present invention.

Referring now to FIG. 2, a block diagram of a second embodiment of the evolutionary document system 200 of the present invention is shown. This second embodiment illustrates that the present invention coupled to a network for additional functionality, and that a single document 106 may initiate a process that produces multiple output documents 108, 230. The second embodiment of the evolutionary document system 200 comprises: a plurality of documents 106, 108, 230, the evolutionary multifunction printer 102, a first document database 202, a second document database 204, a network 208, a document destruction device 210 such as a paper shredder 210 have a code scanner 212.

With regard to the following description, like reference numerals are used to describe like parts. For ease of understanding and clarity, the second embodiment of the system 200 will be described in the context of a particular example, where a document is input, and the system 200 generates two output documents in addition to performing other functions. The first output document is a copy of the input document with certain portions redacted. The second document has a different form with areas of the input document copied to and merged with the form of the second document. Those skilled in the art will recognize that this is just one example of application of the present invention and that the invention can be applied to perform any number of steps and generate any number of documents having different formats and content as will be described in more detail below.

Figure 3A:
FIG. 3A is a graphical representation of an exemplary document including encoding according one embodiment of the present invention.

The input document 106 is similar to that described above with reference to FIG. 1. The input document 106 includes a code 120, preferably a bar code. Referring now also to FIG. 3A, a graphical representation of an exemplary document 106 including encoding according one embodiment of the present invention is shown. The input document 106 is any form such as a medical question and includes a plurality of areas for adding handwritten or typed comments. As can be seen in FIG. 3A, there are two regions 302, 304 where handwriting has been added to the document 106.

Figure 3B:
FIG. 3B is a graphical representation of a second exemplary document that has been processed by according to one embodiment of the present invention.

Referring now to FIG. 3B, a graphical representation of a second exemplary document 108 that has been processed and generated according to one embodiment of the present invention is shown. The first output document 108 is similar to that described above with reference to FIG. 1. The first output document 108 is a reproduction of the input document 106 with a new bar code 122 and three regions 124, 126, 306 redacted or blacked out. For example, the patient's name, patient's signature and other confidential information could be redacted so that the other data could be used such as in medical case studies. In this embodiment, the bar code 122 has been changed so that if the output document 108 is copied it can be correctly identified as linked to the original from which it was generated. In alternate embodiments the bar code 122 could be the same as the input document 106.

Referring now to FIG. 3C, a graphical representation of a third exemplary document 230 that has been generated according to one embodiment of the present invention is shown. The second output document 230 is a form different than that input, for example an application for parking. The handwritten portions 302, 304 of the input document 106 have been extracted and added to an image of the application for parking in the appropriate locations. The evolutionary multifunction printer 102 can also retrieve from memory other information 308 and include it as part of the second output document 230. For example as shown in FIG. 3C, the signature of the applicant 308 is automatically added by evolutionary multifunction printer 102 to the second output document 230. It should also be noted that since the second output document 230 is ancillary to the life cycle of the input document, it can be generated without a bar code.

While the bar codes of the present invention have been shown in the figures as one-dimensional barcodes, those skilled in the art will recognize that in an alternate embodiment two-dimensional bar codes could be used. Because of two-dimensional bar codes have a greater information storing capacity; such bar codes can include a header field that identifies it as an evolutionary document bar code. Optionally, this header is registered with a central authority so that an evolutionary multifunction printer 102 can be sure that it's identified an authentic evolutionary document bar code. The bar codes are used to map the scanned image to the actions that should be applied to it. Because of the limited information capacity for one-dimensional bar codes, they will most likely only be capable of re-directing the system to an off-MFP site where the information about transforming the document image is stored. The bar code might also store only an identifier for the form and the evolutionary multifunction printer 102 could be provided with identification of the site that provides the transformation for that image. This information could be pre-stored or it could be entered on the user interface of the evolutionary multifunction printer 102. Alternatives for mapping a scanned document image onto the actions associated with it, besides bar codes, include normal forms recognition software that uses image characteristics to identify the document. The identifier for the document and the location could be printed on the form, in an Optical Character Recognition (OCR) friendly font, perhaps in a known location such as the lower left corner of every page.

In an alternate embodiment, Radio-Frequency IDentification (RFID) tags could be used instead of bar codes. They could be attached automatically when evolutionary documents are printed or they could be attached manually with stickers that are placed on a document. The presence of a tagged document nearby an evolutionary multifunction printer 102 could trigger actions associated with the tag, such as printing a coupon. An audio feedback could signal the successful reading of an RFID tag. Too many nearby tags (that overload the reader) could be indicated with a different tone.

The evolutionary multifunction printer 102 is described below in more detail with reference to FIGS. 4 and 5, and has the functionality of a conventional MFP such as the ability to scan, copy and fax. In this embodiment, the evolutionary multifunction printer 102 is coupled to a network 208 for communication and cooperation with other devices connected to the network. This is in contrast to the stand-alone mode shown in FIG. 1. The evolutionary multifunction printer 102 is also coupled to a database 202. This connection to the database 202 can either be directly by signal line 206 or via the network 208. The network 206 also coupled the evolutionary multifunction printer 102 to a second database 204. The network 208 can by any one of a conventional type such as a LAN, a WAN The first document database 202 and a second document database 204 are provided for storing different template or forms used by the system 200. The databases 202, 204, are also used to store data extracted from an input document, or the entire document itself. The databases 202, 204, are also used to store data added to an output document. The databases 202, 204 can also be used to track the lifecycle of a document or an instance of a document from the time a first version is input, until that document is destroyed. Particularly for security applications where each instance of a document generated needs to be tracked and accounted for, the database 202, 204 can by used by the system 200 to perform that function.

The document destruction device 210 such as a paper shredder is coupled by signal line 216 to the database 204. In an alternate embodiment, the document destruction device 210 could be coupled to the network 208 by signal line 214. The document destruction device 210 preferably includes a bar code scanner 212. The bar code scanner 212 searches for bar codes on every document it receives and when it finds a bar code, it reads the bar code and transmits its symbolic equivalent to the database 202, 204 together with an indication that the document was destroyed by a particular shredder at a specific time. In an exemplary embodiment, the bar code scanner 212 is a two-sided sensor to read codes as the document travels past a linear sensor. Alternately, a single-sided sensor that reads bar codes on the other side of a sheet could be used or a full page image could be accumulated and bar code recognition could be executed on it. The document destruction device 210 could also include a (possibly two-sided) contact image sensor, like those used in a fax machine, and a one sheet page image buffer, that could hold the sheet currently being shredded so that if the user mistakenly shredded a document, it could be re-printed. This mistake could be indicated by the bar code but it might not be recognized until after the document had been partially shredded. The buffer's contents are encrypted as the bits are inserted, perhaps using the operator's public key, or the public key of the system administrator, so that they remain confidential.

Evolutionary Multifunction Printer 102

Figure 4:
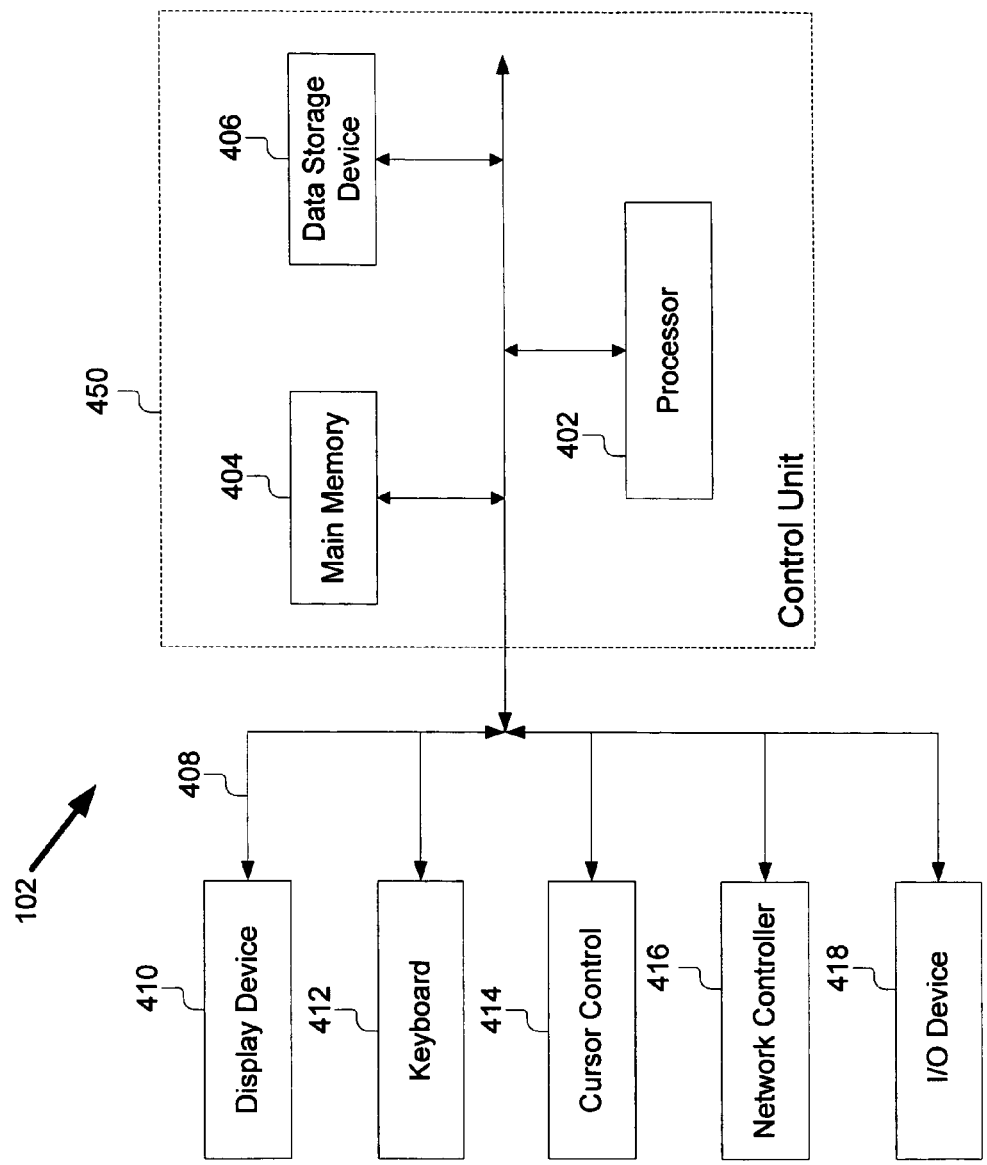
FIG. 4 is a block diagram of one embodiment of an evolutionary multi-function printer in accordance with an embodiment of the present invention.

FIG. 4 is a block diagram of one embodiment of an evolutionary multi-function printer 102 in accordance with an embodiment of the present invention. The evolutionary multi-function printer 102 preferably comprises a control unit 450, a display device 410, a keyboard 412, a cursor control device 414, a network controller 416 and one or more input/output (I/O) device(s) 418.

Control unit 450 may comprise an arithmetic logic unit, a microprocessor, a general purpose computer, a personal digital assistant or some other information appliance equipped to provide electronic display signals to display device 410. In one embodiment, control unit 450 comprises a general purpose computer having a graphical user interface, which may be generated by, for example, a program written in Java running on top of an operating system like WINDOWS® or UNIX® based operating systems. In one embodiment, one or more application programs are executed by control unit 450 including, without limitation, word processing applications, electronic mail applications, financial applications, and web browser applications.

Still referring to FIG. 4, the control unit 450 is shown including processor 402, main memory 404, and data storage device 406, all of which are communicatively coupled to system bus 408.

Processor 402 processes data signals and may comprise various computing architectures including a complex instruction set computer (CISC) architecture, a reduced instruction set computer (RISC) architecture, or an architecture implementing a combination of instruction sets. Although only a single processor is shown in FIG. 4, multiple processors may be included.

Main memory 404 stores instructions and/or data that may be executed by processor 402. The instructions and/or data may comprise code for performing any and/or all of the techniques described herein. Main memory 404 may be a dynamic random access memory (DRAM) device, a static random access memory (SRAM) device, or some other memory device known in the art. The memory 404 is described in more detail below with reference to FIGS. 5 and 6.

Data storage device 406 stores data and instructions for processor 402 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 408 represents a shared bus for communicating information and data throughout control unit 450. System bus 408 may represent one or more buses including an industry standard architecture (ISA) bus, a peripheral component interconnect (PCI) bus, a universal serial bus (USB), or some other bus known in the art to provide similar functionality. Additional components coupled to control unit 450 through system bus 408 include the display device 410, the keyboard 412, the cursor control device 414, the network controller 416 and the I/O device(s) 418.

Display device 410 represents any device equipped to display electronic images and data as described herein. Display device 410 may be, for example, a cathode ray tube (CRT), liquid crystal display (LCD), or any other similarly equipped display device, screen, or monitor. In one embodiment, display device 410 is equipped with a touch screen in which a touch-sensitive, transparent panel covers the screen of display device 410.

Keyboard 412 represents an alphanumeric input device coupled to control unit 450 to communicate information and command selections to processor 402. The Keyboard 412 can be a QWERTY keyboard, a key pad, or representations of such created on a touch screen.

Cursor control 414 represents a user input device equipped to communicate positional data as well as command selections to processor 402. Cursor control 414 may include a mouse, a trackball, a stylus, a pen, a touch screen, cursor direction keys, or other mechanisms to cause movement of a cursor.

Network controller 416 links control unit 450 to a network 208 that may include multiple processing systems. The network of processing systems may comprise a local area network (LAN), a wide area network (WAN) (e.g., the Internet), and/or any other interconnected data path across which multiple devices may communicate. The control unit 450 also has other conventional connections to other systems such as a network for distribution of files (media objects) using standard network protocols such as TCP/IP, http, https, and SMTP as will be understood to those skilled in the art.

One or more I/O devices 418 are coupled to the system bus 408. For example, the I/O device 418 includes an image scanner and document feeder for capturing an image of a document. The I/O device 418 also includes a printer for generating documents. The I/O device 418 may also include audio input/output device equipped to receive audio input via a microphone and transmit audio output via speakers. In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that evolutionary multi-function printer 102 may include more or less components than those shown in FIG. 4 without departing from the spirit and scope of the present invention. For example, evolutionary multi-function printer 102 may include additional memory, such as, for example, a first or second level cache, or one or more application specific integrated circuits (ASICs). Similarly, additional components input/output devices 418 may be coupled to control unit 450 including, for example, an RFID tag reader, digital still or video cameras, or other devices that may or may not be equipped to capture and/or download electronic data to control unit 450. One or more components could also be eliminated such as cursor control 414.

Figure 5:
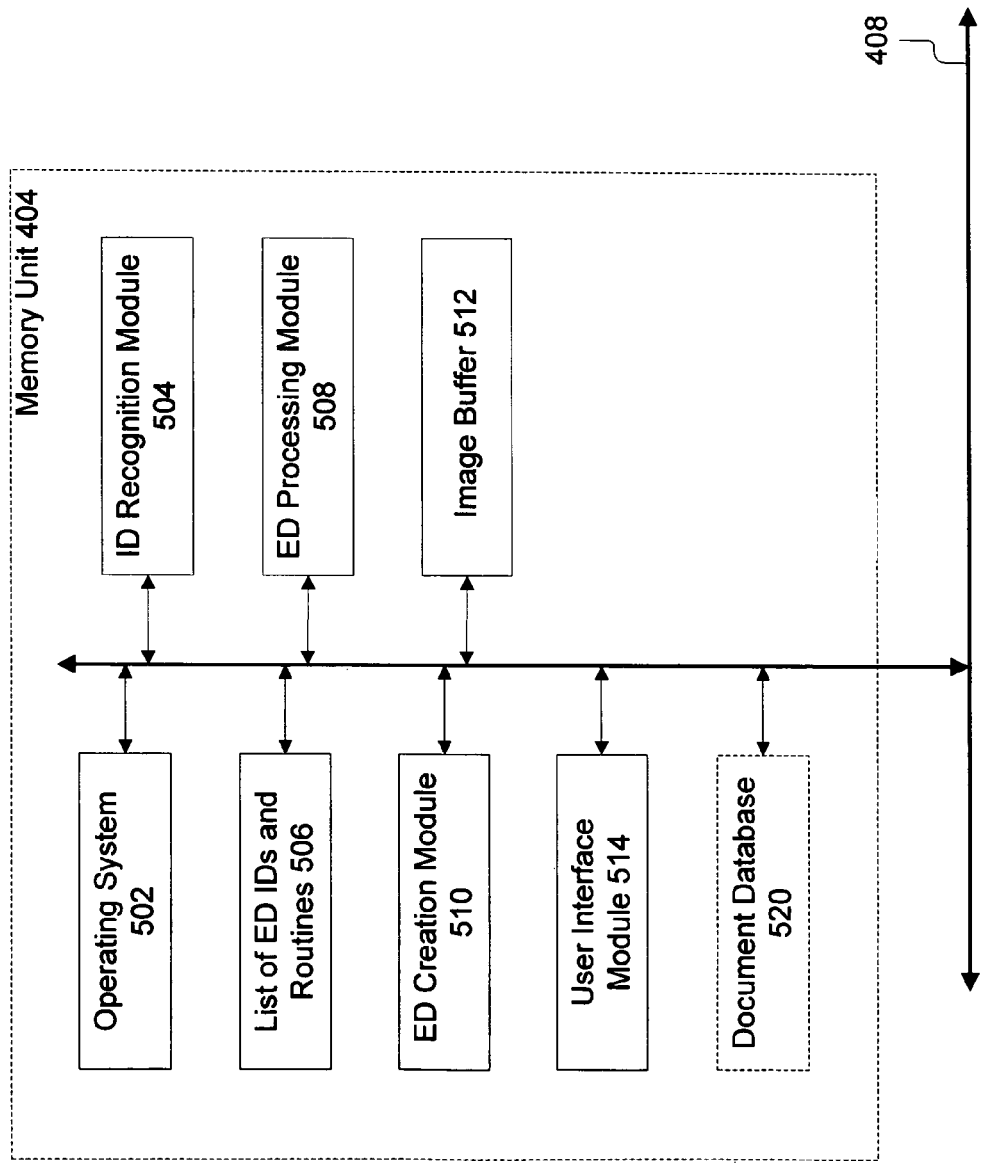
FIG. 5 is a block diagram of one embodiment of the memory for the evolutionary multi-function printer.

FIG. 5 is a block diagram of one embodiment of the memory 404 for the evolutionary multi-function printer 102. The memory 404 for the evolutionary multi-function printer 102 preferably comprises: an operating system 502, an identification recognition module 504, a list of evolutionary document identification numbers and routines 506, an evolutionary document processing module 508, an evolutionary document creation module 510, an image buffer 512, a user interface module 514, and a document database 520. As noted above, the memory unit 404 stores instructions and/or data that may be executed by processor 402. The instructions and/or data may comprise code for performing any and/or all of the techniques described herein. These modules 502-520 are coupled by bus 408 to the processor 402 for communication and cooperation to provide the evolutionary document system 200. Those skilled in the art will recognized that while the present invention will now be described as modules or portions of a memory unit 404 of a computer system, the modules or portions may also be stored in other media such as permanent data storage device 406 and may be distributed across a network 208 having a plurality of different computers such as in a client/server environment.

The operating system 502 is preferably one of a conventional type such as, WINDOWS®, SOLARIS® or LINUX® based operating systems. Although not shown, the memory unit 404 may also include one or more application programs including, without limitation, word processing applications, electronic mail applications, financial applications, and web browser applications.

The identification recognition module 504 is used to identify the bar code or document. In one embodiment, the identification recognition module 504 is software capable of processing an image, extracting the bar code, and scanning or reading the bar code to get and alpha numeric string representing the document. In another embodiment, the identification recognition module 504 is software for image pattern matching or forms recognition as has been discussed above.

The list of evolutionary document identification numbers and routines 506 is preferably a table storing document identification numbers that correspond to the documents, and one or more corresponding tasks or routines. Examples of such corresponding tasks or routines are described below with reference to FIG. 7.

The evolutionary document processing module 508 is a set of defined routines for performing the processing associated with each document as prescribed in the list of evolutionary document identification numbers and routines 506. These routines are able to use the information from the list of evolutionary document identification numbers and routines 506 and work with the processor 402 to perform any number of actions such as: creating forms, redacting forms, storing image data in the database, updating the status of a document, removing data from the database, etc.

The evolutionary document creation module 510 is a module and routines for creating an evolutionary document. This process is described in more detail below with reference to FIGS. 6 and 8A and 8B. The evolutionary document creation module 510 allows the user to create an evolutionary document, define the document format, specify what action will be taken upon the document, and prescribe what feedback will be provided by the on the display 410 of the evolutionary multi-function printer 102 back to the user.

The image buffer 512 is used for temporary storage of a scanned image during manipulation by the evolutionary document processing module 508 in performing the task(s) specified by the list of evolutionary document identification numbers and routines 506. The image buffer 512 can also be used to store documents created by the evolutionary document processing module 508 before they are sent to the output device 418 for printing.

The user interface module 514 communicates with and is responsive to the evolutionary document processing module 508. The user interface module 514 generates information and commands that cause message to be displayed to the user via the display device 410. Several actions can be performed on an input document after it is scanned. Many depend on or require instructions or cooperation of a human operator. The user interface module 514 includes routines to cause prompts to be displayed on the display device 410 of the evolutionary multi-function printer 102. These prompts instruct the user to keep the document, file it in a particular location, or destroy it. These instructions can require confirmation such as by pressing a button of the keypad 412.

The document database 520 is used to store documents that have been processed and scanned. The document database 520 can also maintain one or more data structures to track an evolutionary document through its lifecycle from creation to destruction. The document database 520 can also be used to temporarily store documents before migration to other databases 202, 204 in the system 200, but outside of the evolutionary multi-function printer 102. Another application for the document database 520 is to track evolutionary documents through their lifecycle from creation to destruction. After a document is processed (all actions associated with the evolutionary document are completed), it can be "expired." That is, the record for the document can be updated to show its bar code identifier is no longer valid. If the document is scanned again on evolutionary multi-function printer 102, it can trigger a response, which includes: 1) alert the current user by flashing a message on the console or sounding a alert that the input is no longer useful; 2) alert another user, such as a System Administrator, by sending an email message indicating that an invalid document was just scanned on a particular evolutionary multi-function printer 102; or trigger a feeder-marking device (see below) to apply an "EXPIRED" message to the document. The expiration process can be associated with networked evolutionary document shredders that expect to receive an expired document within some period of time. If they don't, the system 200 can trigger any of a variety of alerts that include sending email to administrators, etc. Users can be motivated to shred their expired documents by adding a small fee to their pay check, publicizing their shredding performance on a web site, or awarding points in a contest that recognizes people who shred their expired documents as soon as possible after they're scanned.

Evolutionary Document Processing

Referring now FIG. 6, one embodiment of a method for creating and processing evolutionary documents according to the present invention will be described. At a general level, the method of the present invention has three major stages that can be separated in time. These three major stages include: 1) pre-use state where the evolutionary document is created, 2) user interaction with and input for processing the evolutionary document, and 3) processing of the evolutionary document by the evolutionary multi-function printer 102 including production of successive generations of the evolutionary document.

Figure 6:
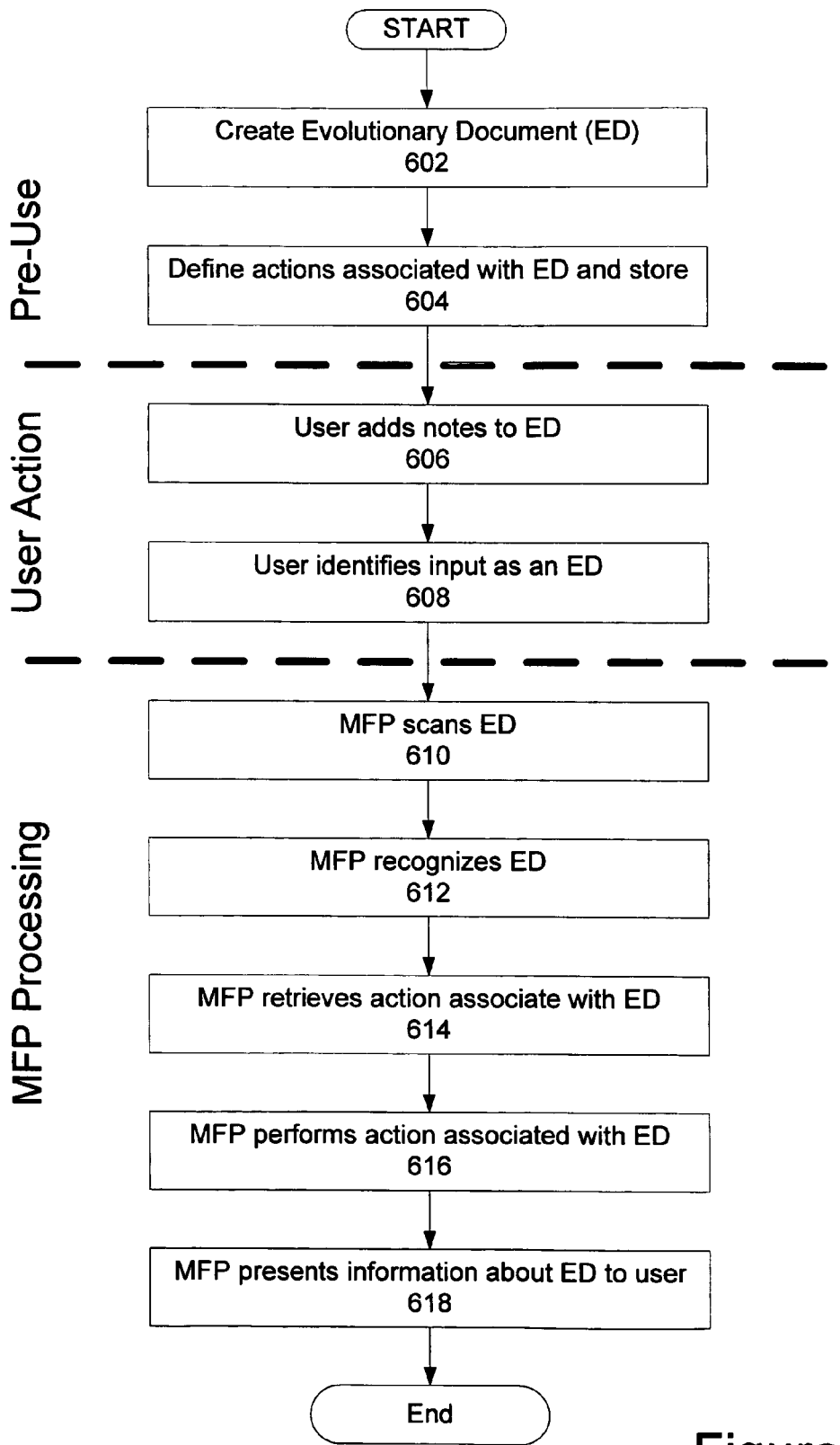
FIG. 6 is a flowchart of one embodiment of a method for creating and processing evolutionary documents according to the present invention.

As shown in FIG. 6, the method begins with the pre-use stage. In step 602, the evolutionary document is created or designed. This creation step includes specifying a form, its fields, the physical layout and content of the form, and assigning the form with a bar code. Next, in step 604, the actions associated with the evolutionary document are defined. The actions associated with each field on the form during each stage of its lifecycle are specified. These actions as well as the code corresponding to the evolutionary document are stored, preferably in the list of list of evolutionary document identification numbers and routines 506. Alternately, the actions are stored in the bar code or in an external database 202, 204. The created evolutionary document may then be printed and circulated for use.

Next, in the user action stage, a printed version of the evolutionary document is manipulated by the user. The user may add notes and other handwritten or type written additions 606 to the evolutionary document. The user then walks up to the evolutionary multi-function printer 102, inserts the evolutionary document and selects 608 an option for evolutionary copying (as opposed to standard copying) on the keypad 412 of the evolutionary multi-function printer 102. The user may input one or more additional processing options for the evolutionary document. These options may be provided by the evolutionary multi-function printer 102, or may be responsive to the type of evolutionary document scanned and may need user input selections during the processing by the evolutionary multi-function printer 102.

Next, in the MFP processing stage, the evolutionary multi-function printer 102 scans 610 the document. The evolutionary multi-function printer 102 uses the scanned image to identify 612 the evolutionary document, and its state. As described above, this can be done by scanning the bar code or by performing form matching. Once the evolutionary document has been identified, a query can be performed on the database 520, 202, 204 to determine the documents state. The content of the form may also be used to determine state (e.g., patient intake form with the patient name visible). Using the evolutionary document identification number, the evolutionary multi-function printer 102 then retrieves 614 the actions (e.g., black out patient's name) associated with and to be applied to the evolutionary document. For example, these actions are retrieved from the list of evolutionary document identification number and routines 506 or the database 202, 204. The evolutionary multi-function printer 102 performs 616 the actions associated with the evolutionary document and prints any new documents. Then the evolutionary multi-function printer 102 presents 618 information about the evolutionary document to the user. For example, the evolutionary multi-function printer 102 can display messages on its user interface confirming the actions performed or messages about any follow-up action (e.g., destroy the original).

Figure 7:
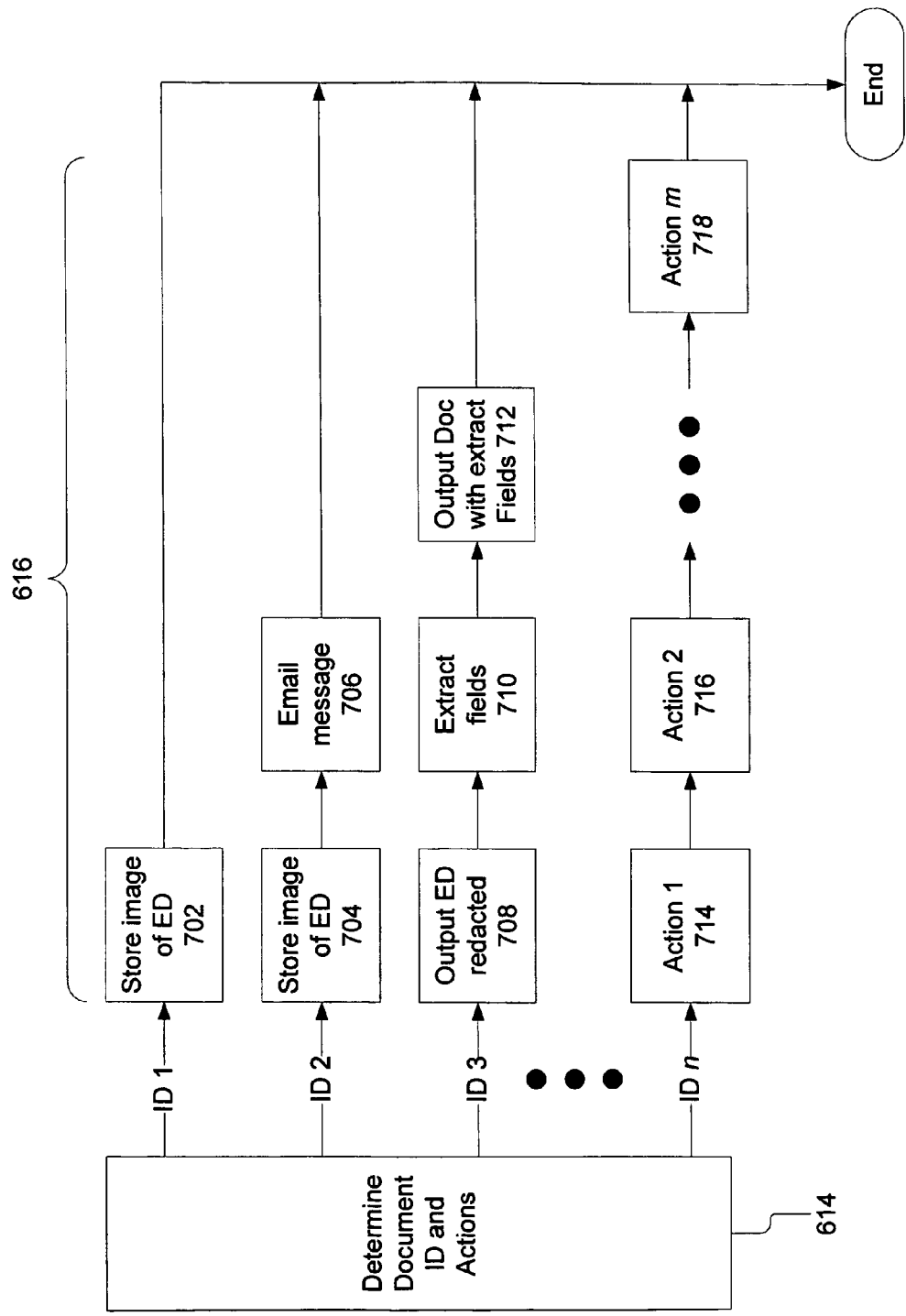
FIG. 7 is a flow diagram showing exemplary actions performed by the evolutionary multi-function printer of the present invention responsive to different codes.

Referring now to FIG. 7, exemplary actions performed by the evolutionary multi-function printer 102 of the present invention responsive to different codes are shown. These actions are only provided by way of example and those skilled in the art will recognize that various other actions and processing steps may be performed on or using an input evolutionary document. As shown in FIG. 7, the processing step of identifying the document identification (bar code) is done by scanning or decoding the information in the bar code. This process yields an identification number. Depending on the identification number produced, an action path is executed. For example, if the identification number is 1, the method simply stores 702 the scanned evolutionary document in the database 520 and does no more. If the identification number is 2, the evolutionary multi-function printer 102 stores 704 the scanned evolutionary document in the database 520 and sends 706 an email to a pre-defined email address indicating the evolutionary document has been scanned. If the identification number is 3, the evolutionary multi-function printer 102 outputs 708 a redacted version of the scanned document, extracts 710 fields from the scanned image, and retrieves another form, and creates 712 a new document by combination and prints that new document. Thus, as can be seen from FIG. 7, the actions taken on an evolutionary document for an given identification number (ID n) can any number of actions 714, 716, 718. Although not shown, an action path may include branches where multiple parallel actions are taken. Furthermore, the action paths may include conditional branches based on input from the user, data retrieved from the data base, a certain state or condition or data in the scanned image. Those skilled in the art will recognize the number of possible actions that may be specified to be performed automatically by the evolutionary multi-function printer 102.

Evolutionary Document Creation

Figure 8A:
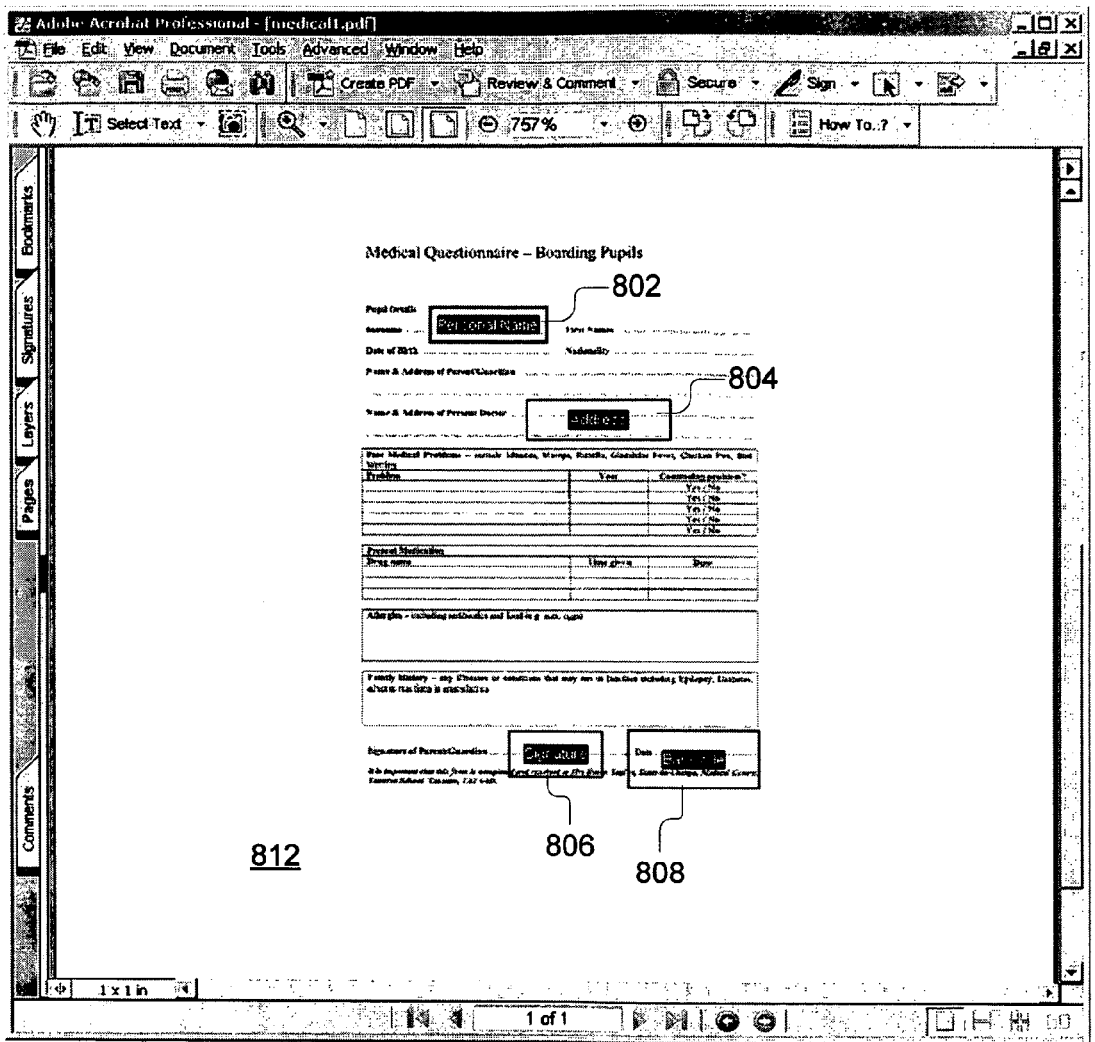
FIG. 8A is a graphical representation of an interface for generating an encoded document according to one embodiment of the present invention.
Figure 8B:
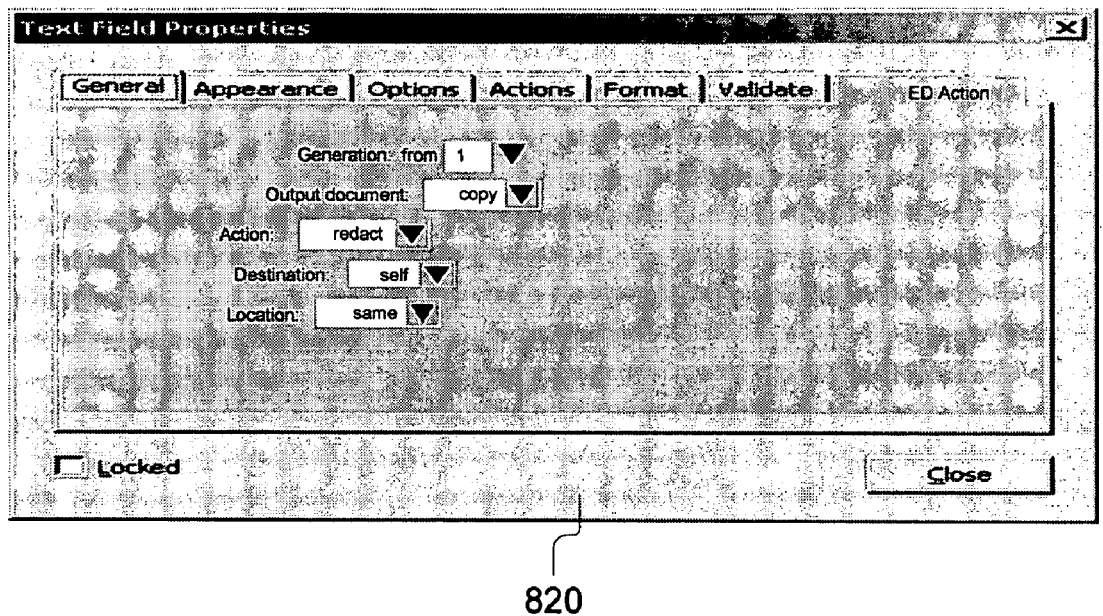
FIG. 8B is a graphical representation of an interface for specifying one or more actions associated with an encoded document according to one embodiment of the present invention.

Referring now to FIGS. 8A and 8B, the process for defining or creating an evolutionary document will be described in more detail. FIGS. 8A and 8B are graphical representations of interfaces for generating an evolutionary document and specifying actions for the evolutionary document. In one embodiment, the evolutionary document creation module 510 is a stand-alone application for designing evolutionary documents. This stand-alone application lets the user attach actions, such as SQL database update commands, to fields on a form, and specify how scanned images of the form are processed. This stand-alone application can also import scanned images of forms (or postscript or PDF) and apply similar design processes to them. However, in the preferred embodiment, the evolutionary document creation module 510 is as a plug-in module for commonly used word processing applications such as Microsoft® Word or Adobe® Acrobat. Using the plug-ins, users specify the transformation of an evolutionary document from one state to another, including the areas on the form that contain pertinent data and the disposition of the data in those areas. The plug-in creates evolutionary document bar codes that are applied to every print-out of the form. The bar code preferably contains an encoded registration number that would allow the evolutionary multi-function printer 102 to verify it should apply the transformation. The plug-in requests the registration number from a server (not shown) and in return is guaranteed that the form would be processed correctly by any compliant evolutionary multi-function printer 102. The registration can be effective for a limited term, forever, or for a fixed number of re-generations of paper documents with that registration number. At the time the evolutionary multi-function printer 102 looks up the registration number it also looks up the information about the transformation.

FIG. 8A shows an example of evolutionary document design implemented in as an Acrobat plug-in module. Using Adobe® Acrobat as an editor, a document 812 can be presented for review by the user in a window 810. The plug-in module shows that the user has added three fields 802, 804, 806 to an existing Acrobat document, designated them as Personal Name 802; Address 804, and Signature 806, and specified the actions associated with each one. Using the user interface 820 shown in FIG. 8B, the user can specify the source document, the output document, the action, the destination and other features associated with a particular field. The location for the bar code 808 is also specified as well as the actions associated with each field on the form and the prompts that are displayed on display 410 of the evolutionary multi-function printer 102 when the document is copied. The plug-in module creates a bar code that incorporates all the information the user added to the .pdf document and adds that bar code to the .pdf file. Any subsequent print outs of that .pdf document will include the bar code whether or not that user has the evolutionary document Acrobat plug-in module. Only the basic Acrobat Reader is required to print the evolutionary document. Appendix A shows the XML that represents the locations of fields, the bar code, and actions associated with the fields on form in FIG. 8A. The same XML can be represented in plain ASCII in the bar code.

Figure 9:
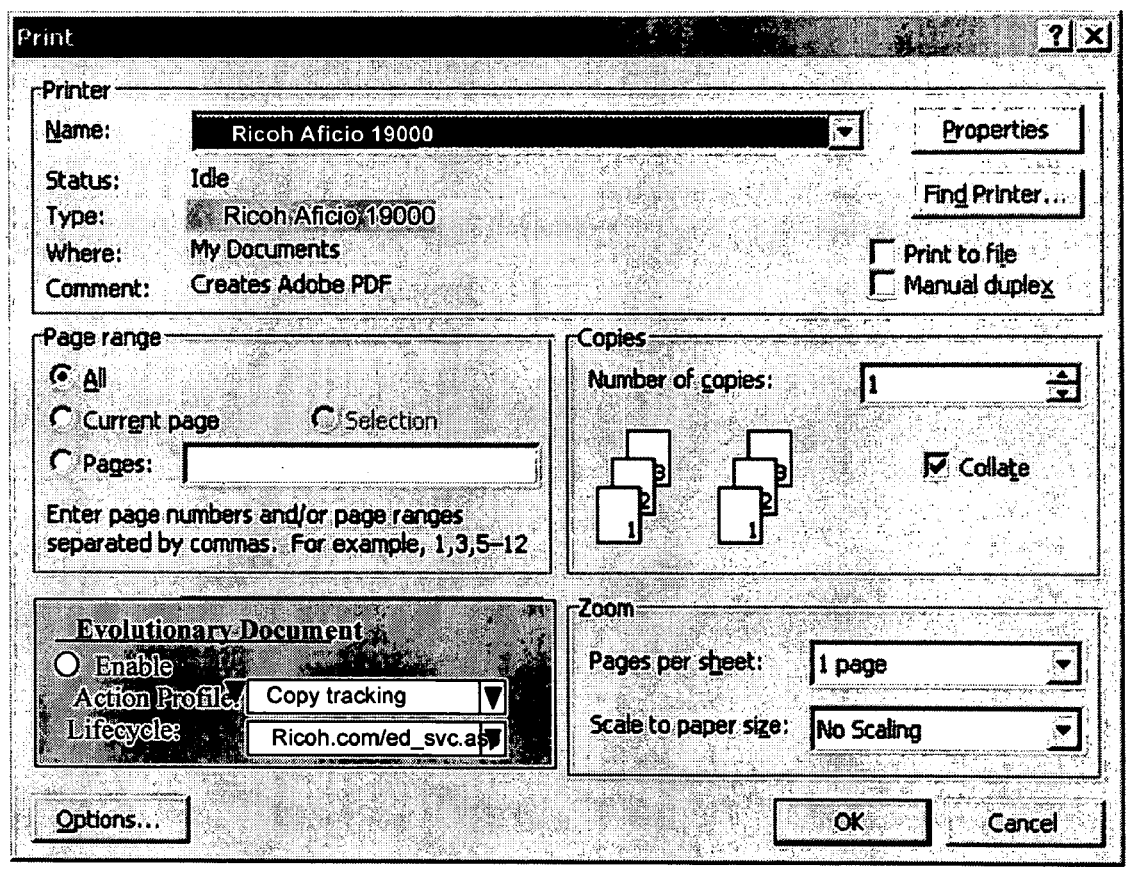
FIG. 9 is a graphical representation of a printer driver for generating an encoded document according to one embodiment of the present invention.

Another alternative to the stand-alone application or the plug-in module is to provide the functionality as part of the printer driver. This allows addition of the evolutionary document capabilities to any document, independent of the application that generated it. An example application is copy tracking. A Microsoft Word user (or equivalently the user of Netscape Communicator, Adobe Acrobat, Outlook, PowerPoint, FireFox, etc.), after opening the Print dialog box, could be presented with options that let them print an evolutionary document that automatically causes an evolutionary multi-function printer 102 to count the number of times the document is copied. An exemplary print dialog box is shown in FIG. 9. The user could receive email messages every time the document is copied or whenever a specified number of copies are made (e.g., every ten copies trigger an alert). Other applications include specifying that any copies are automatically "branded" with a "Confidential" stamp in the background, or providing a console prompt that requires the entry of a user name and password before a copy is produced. The print driver on the personal computer could make http calls to the security server to register the printed document, or a decentralized on-site server, perhaps hosted on an evolutionary multi-function printer 102, that provides the evolutionary document service. The PDL downloaded to the evolutionary multi-function printer 102 includes commands that cause the printer to, for example, generate and print a "copy tracking" bar code on every page of this document. The printer generates the appropriate bar code and after laying out each page, positions the bar code so that it obscures the least amount of the already-laid out information. The symbolic information associated with the bar codes could be uploaded to the appropriate server immediately with an http call, an email message, a UDP message, etc. Or it could be queued until communication could be established.

Document Lifecycle

Figure 10:
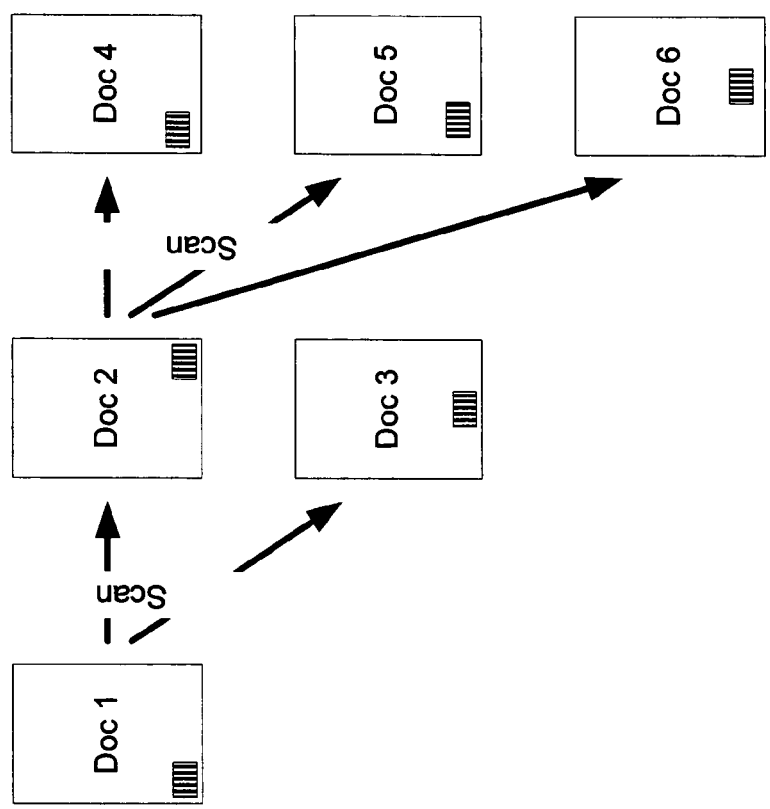
FIG. 10 is graphical representation of operation of the present invention with multiple generations of evolutionary documents.

FIG. 10 is graphical representation of operation of the present invention with multiple generations of evolutionary documents. This figure illustrates how a single document can generate multiple documents. A first document is scanned by evolutionary multi-function printer 102. This causes second and third documents to be produced. Once the second document is scanned, this produces a fourth, fifth and six documents. Thus, a single document can generate several documents each with different processing. The state and use of these documents until their destruction can also be tracked since each includes its own bar code. This allows the complete lifecycle for a single document and all its progeny to be tracked and to ensure restrictions on the documents especially in controlled environments.

Other Embodiments

Figure 11:
FIG. 11 is a graphical representation of an exemplary document including markings indicating an action for the document or its status as expired according one embodiment of the present invention.

In one alternate embodiment, the evolutionary multi-function printer 102 can also include a feeder-marking device. The feeder marking device is in communication with the processing module 508 and causes a mark to be applied to the original document as it passes through the document feeder of the evolutionary multi-function printer 102. When the user invokes the evolutionary copying process, part of the meta description for the task includes the disposition of the input document. This can include instructions to the feeder to apply a mark to the documents that pass through the feeder. The feeder-marking device can be as a simple as an inked wheel that's mechanically depressed onto the face of the documents. That wheel can include letters that spell messages such as "EXPIRED" that are applied repeatedly. Also, the position of the marking can be adjusted so that it obscures the bar code. The feeder-marking device can also be a set of normal inkjet printing heads placed at the end of the feeder's paper path. The message they print and the number and size of the messages can be adjusted based on cost and application considerations. FIG. 11 shows an example of the "DESTROY" marking applied by 4 ink jet heads across the face of an input form. The ink jet heads can apply the message to both sides of an input document or just to its face, depending on the system requirements. Alternatively, an ink jet head could extend across the face of the document so that it could completely obscure the page. Yet another alternative for the feeder-marking engine is to place it under the platen of the multi-function printer 102, on the scan head, and direct a laser up through the platen to score the document. Nine laser beams spaced one inch apart and swept through the width of the document would apply an unambiguous indication that this document is no longer current. The laser emitters could be placed on the scan head aft of its direction of travel.

In another alternate embodiment, a camera on a cell phone or any other portable device could capture an evolutionary document. The cell phone could do bar code recognition and prompt the user for actions that need to be taken for that document. For example, "ensure that a 7-digit phone number is present in box 5." After bar code recognition, the user is prompted to scan a specific field on the document. The cell phone could capture the image of that field and send it, via an email message, to the database associated with that document. For example, the handwritten description of a patient's diagnosis could be captured by a doctor sitting at his desk (or sitting at a table in a remote location) obviating the need for a separate trip to an evolutionary multi-function printer 102. In return, the doctor would receive a validation code that he could hand-print on the form that would verify successful reception of the scanned image by the database. This code would also be stored on the cell phone with the original scanned image. The next generation of the evolutionary document could be sent to a printer nearby the user, rather than the same evolutionary multi-function printer 102 that scanned the document or it could send it to a fax machine. An electronic representation of the evolutionary document could be returned to the user's cell phone and he could decide where to print it. In another instance he might send the document to a nearby fax machine.

In yet another alternate embodiment, existing documents, originally intended for some other purpose, are used as first generation evolutionary documents. For example, a user could scan their driver's license and the system 200 could print discount coupons. The coupons might include the user's name and address from the license. The coupons could also be generated based on the user's buying history. For example, because other residents of the same address purchased Ivory soap last month, the system 200 could print an Ivory soap coupon because it anticipates that the user needs some more soap. Of course, it could substitute coupons or competing products that the store owner would like to promote. The bar code on the coupons could include the user's identifying information and when the user purchases the indicated product using that coupon, the system 200 would recognize the bar code and generate another coupon for a product that it thinks the user might need. Another version could create a copy of the driver's license with confidential information redacted, such as the user's home address. This copy would be sufficient for certifying that the user's identity and date of birth had been verified, but would guarantee that their residence could not be located.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

APPENDIX A

Example XML For Creation Of An Evolutionary Document

```
<Ricoh Evolutionary Document>
    <title> Medical Questionnaire </title>
        <fields>
            <Personal Name>
                <minx>2.0</minx><maxx>3.5</maxx>
                <miny>2.0</miny> <maxy>3.0</maxy>
                <action>
                    <generation from>1</from> <generation to> 2
                    </to> <field action> REDACT </field action>
                    <location> same </location>
                    <destination> self </destination>
                </action>
            </Personal Name>
        ...
            <Bar Code>
                <style> PDF417 </style>
                <minx>5.0</minx><maxx>7.0</maxx>
                <miny>9.5</miny> <maxy>10.5</maxy>
            </Bar Code>
        </fields>
        <Output Documents>
            <number> 1
                <style> modified version of input </style>
                <generations> all </generations>
            </number>
        </Output Documents>
</Ricoh Evolutionary Document>
```

What is claimed is:

1. A method for processing documents comprising the steps of:
   using a multifunction printer to perform the steps of:
      receiving an input evolutionary document, the input evolutionary document having an identification number and a field that includes user input;
      identifying the identification number associated with the input evolutionary document based at least in part on image pattern matching;
      determining a first state for the input evolutionary document based at least in part on a query performed on a database;
      determining an action path based at least in part on the identification number, the action path including at least one of an action, multiple parallel actions and conditional actions conditioned on at least one of the user input, the first state and data retrieved from the database;
      determining, from the database, that the action path is to extract the user input field;
      extracting the user input field from the input evolutionary document;

retrieving a form having a first code configured to identify a location on the form to add the user input field;

determining, based at least in part on the first code, the location on the form to add the user input field;

creating a new document by combining the form with the extracted user input field at the location;

determining a second state for the new document; and tracking, from the database, the state of the new document through its lifecycle from creation to destruction including alerting a user of copying the new document.

2. The method of claim 1, wherein the step of identifying includes scanning a second code from the input evolutionary document.

3. The method of claim 2, wherein the second code is one from the group of a two-dimensional bar code and a one-dimensional bar code.

4. The method of claim 2, further comprising a step of decoding the second code to determine the field of the input evolutionary document and a corresponding action for the field.

5. The method of claim 1 further comprising a step of reprinting a mistakenly destroyed document using an image buffer having encrypted content.

6. The method of claim 1, further comprising a step of retrieving an action to be applied to the field of the input evolutionary document.

7. The method of claim 6, further comprising a step of retrieving the action from the database, the database coupled to the multifunction printer.

8. The method of claim 1, further comprising a step of retrieving a plurality of actions to be performed on a plurality of fields of the input evolutionary document.

9. The method of claim 1, further comprising a step of performing an action, wherein the action is one from the group of: storing the field of the input evolutionary document, redacting the field of the input evolutionary document, printing the field of the input evolutionary document, sending an email related to the field, sending an alert related to the field, displaying an alert related to the field, printing a version of the input evolutionary document having a modified version of the field, updating a database related to the field, and marking the field of the input evolutionary document.

10. The method of claim 1, further comprising a step of outputting a plurality of documents at least one of which includes content from the field of the input evolutionary document.

11. The method of claim 1, further comprising a step of creating the input evolutionary document, wherein the step of creating the input evolutionary document includes defining at least one field and an action associated with the at least one field.

12. The method of claim 11, wherein the step of creating the input evolutionary document includes defining a physical layout and content for the evolutionary document.

13. The method of claim 11, wherein the step of creating the input evolutionary document includes generating a file in a format printable by a word processing application.

14. The method of claim 1, further comprising a step of displaying a message related to the input evolutionary document to a user.

15. The method of claim 14, wherein the message is one from the group of: a confirmation that the input evolutionary document has been processed, an instruction to destroy the input evolutionary document, an instruction of how to handle the input evolutionary document, and a request for input from the user.

16. The method of claim 1, further comprising the steps of:
scanning the input evolutionary document;
identifying the input evolutionary document;
updating the state for the input evolutionary document in the database; and
destroying the input evolutionary document.

17. The method of claim 1, further comprising scanning the input evolutionary document by capturing an image of the input evolutionary document with a portable communication device.

18. A device for processing paper-based and electronic documents, the device comprising:
a processor;
a recognition module stored on a memory and executable by the processor, the recognition module for identifying an identification number associated with an input evolutionary document based at least part on image pattern matching, the input evolutionary document having the identification number and a user input field that includes user input; the recognition module determining a first state for the input evolutionary document based at least in part on a query performed on a document database; the recognition module determining an action path based at least in part on the identification number, the action path including at least one of an action, multiple parallel actions and conditional actions conditioned on at least one of the user input, the first state and data retrieved from the database; the recognition module determining, from the document database, that the action path is to extract the user input field; the recognition module having an input and an output, the input of the recognition module coupled to receive an image of the input evolutionary document;
a document processing module stored on the memory and executable by the processor, the document processing module having an input and an output, the document processing module for extracting the user input field from the input evolutionary document, retrieving a form having a first code configured to identify a location on the form for adding the user input field; and
an evolutionary document creation module coupled to the recognition module, the evolutionary document creation module for receiving the form having the code configured to identify the location on the form to add the user input field, for determining, based at least in part on the code, the location on the form to add the user input field and for creating a new document by combining the form with the user input field at the location,
wherein the recognition module determines a second state for the new document and tracks, from the document database, the state of the new document through its lifecycle from creation to destruction including alerting a user of copying the new document.

19. The device of claim 18 wherein the recognition module includes a scanner for scanning the image of the input evolutionary document for a second code.

20. The device of claim 19 wherein the recognition module translates the output of the scanner into a document identification number.

21. The device of claim 19 wherein the second code is one from the group of a two-dimensional bar code and a one-dimensional bar code.

22. The device of claim 18 further comprising a printer reprinting a mistakenly destroyed document using an image buffer having encrypted content.

23. The device of claim 18 further comprising a table having at least one document identification number and a corresponding action for each document identification number, and wherein the recognition module scans the image of the input evolutionary document to produce a document identification number, and the action listed in the table corresponding the document identifier is the action provided to the document processing module.

24. The device of claim 18 further comprising an image buffer having an input and an output, the image buffer coupled to receive the image of the input evolutionary document, the output of the image buffer coupled to the recognition module and the document processing module for providing the image of the input evolutionary document.

25. The device of claim 18 wherein the input evolutionary document creation module for creating the input evolutionary document includes at least one field and an action corresponding to the at least one field.

26. The device of claim 25 wherein the evolutionary document creation module is one from the group of a stand-alone application, a plug-in module for a word processor, and a printer driver.

27. The device of claim 18 further comprising a user interface for communicating with a user, the user interface module coupled to the document processing module for sending prompts and requests to the user and receiving input from the user.

28. The device of claim 18 further comprising the document database, for storing a plurality of documents, the document database coupled to the document processing module for receiving and sending documents for processing by the document processing module in accordance with actions specified for the documents.

29. The device of claim 28 further comprising a network connection for coupling the device to a second document database remote to the device, the device coupled to the second document database by a network, the second document database for storing a plurality of documents, the second document database coupled to the document processing module for receiving and sending document for processing by the document processing module in accordance with actions specified for the documents.

30. The device of claim 18 further comprising a network connection for coupling the device to a document database remote to the device, the device coupled to the document database by a network, the document database for storing a plurality of documents, the document database coupled to the document processing module for receiving and sending documents for processing by the document processing module in accordance with actions specified for the documents.

31. The device of claim 18 further comprising:
an image capture device for generating the image of the input evolutionary document, the image capture device coupled to the recognition module; and
a printer for generating a document, the printer coupled to the document processing module.

32. The device of claim 18 further comprising:
an input device for inputting data to the device, the input device coupled to the document processing module; and
a display device for displaying information to a user, the display device coupled to the document processing module.

33. The device of claim 18 wherein the document processing module is adapted to perform an action from the group of: storing the field of the input evolutionary document, redacting the field of the input evolutionary document, printing the field of the input evolutionary document, sending an email related to the field, sending an alert related to the field, displaying an alert related to the field, printing a version of the input evolutionary document having a modified version of the field, updating a database related to the field, and marking the field of the input evolutionary document.

34. The device of claim 18 further comprising storage for transformation information, the storage coupled to the document processing module and the recognition module for transforming the identified input evolutionary document into an action.

35. The device of claim 18 wherein the recognition module is adapted to identify the input evolutionary document from the image of the input evolutionary document, the recognition module decoding a bar code into at least one action to be performed on the input evolutionary document.

36. The device of claim 18 wherein the recognition module is adapted to decode a bar code to generate one from the group of document state, new document bar codes, other document, locations for other documents and an action for other documents.

37. The device of claim 18 further comprising a document destruction device having a document identification module, the document destruction device for destroying any document input, the document identification module identifying the document provided to the document destruction device prior to destruction, the document identification module coupled to the document processing module for specifying which documents have been destroyed.

38. The device of claim 18 further comprising a feeder-marking device for marking documents as they past through a feeder, the feeder-marking device coupled to the document processing module for receiving instructions on marking for a document being processed.

39. A method for processing documents comprising the steps of:
using a multifunction printer to perform the steps of:
scanning an input evolutionary document, the input evolutionary document having an identification number and a field that includes user input;
identifying the identification number associated with the input evolutionary document based at least in part on image pattern matching;
determining a first state for the input evolutionary document at least in part based on a query performed on a database;
determining an action path based at least in part on the identification number, the action path including at least one of an action, multiple parallel actions and conditional actions conditioned on at least one of the user input, the first state and data retrieved from the database;
determining, from the database, that the action path is to redact the user input field;
redacting the user input field from the input evolutionary document;
outputting a redacted evolutionary document;
determining a second state for the redacted evolutionary document; and
tracking, from the database, the state of the redacted evolutionary document through its lifecycle from creation to destruction including alerting a user of copying the new document.

40. A device for processing paper-based and electronic documents, the device comprising:
a processor;
a recognition module stored on a memory and executable by the processor, the recognition module for identifying an identification number associated with an input evolutionary document based at least in part on image pattern matching, the input evolutionary document having the identification number and a field that includes user input, the recognition module determining a first state for the input evolutionary document based at least in part on a query performed on a document database and determining an action path based at least in part on the identification number, the action path including at least one of an action, multiple parallel actions and conditional actions conditioned on at least one of the user input, the first state and data retrieved from the database, the recognition module determining, from the document database, that the action path is to redact the user input field, the recognition module having an input and an output, the input of the recognition module coupled to receive an image of the input evolutionary document; and a document processing module stored on the memory and executable by the processor, the document processing module, having an input and an output, for redacting the user input field from the input evolutionary document and outputting a redacted evolutionary document;

wherein the recognition module determines a second state for the redacted evolutionary document and tracks, from the document database, the state of the redacted evolutionary document through its lifecycle from creation to destruction including alerting a user of copying the new document.

\* \* \* \* \*